(12) United States Patent
Talvitie et al.

(10) Patent No.: US 12,476,686 B2
(45) Date of Patent: Nov. 18, 2025

(54) BEAM MANAGEMENT

(71) Applicant: Nokia Technologies Oy, Espoo (FI)

(72) Inventors: Jukka Olavi Talvitie, Ylöjärvi (FI);
Jari Yrjänä Hulkkonen, Oulu (FI);
Sami-Jukka Hakola, Kempele (FI);
Esa Tapani Tiirola, Oulu (FI); **Toni
Aleksi Levanen, Tampere (FI); Mikko
Valkama**, Nokia (FI)

(73) Assignee: Nokia Technologies Oy, Espoo (FI)

( * ) Notice: Subject to any disclaimer, the term of this patent is extended or adjusted under 35 U.S.C. 154(b) by 378 days.

(21) Appl. No.: 18/044,374

(22) PCT Filed: Aug. 26, 2021

(86) PCT No.: PCT/EP2021/073567
§ 371 (c)(1),
(2) Date: Mar. 7, 2023

(87) PCT Pub. No.: WO2022/053323
PCT Pub. Date: Mar. 17, 2022

(65) Prior Publication Data
US 2023/0327734 A1    Oct. 12, 2023

(30) Foreign Application Priority Data
Sep. 10, 2020  (EP) .................................. 20195504

(51) Int. Cl.
*H04B 7/06* (2006.01)
*H04B 7/08* (2006.01)

(52) U.S. Cl.
CPC ....... *H04B 7/06952* (2023.05); *H04B 7/0617* (2013.01); *H04B 7/088* (2013.01)

(58) Field of Classification Search
CPC .... H04B 7/0695; H04B 7/0617; H04B 7/088; H04B 7/0408; H04B 7/0626; H04B 7/0413; H04W 16/28; H04W 24/10; H04W 72/0453; H04W 72/046; H04L 5/0048; H04L 25/0226
See application file for complete search history.

(56) References Cited

U.S. PATENT DOCUMENTS

| | | |
|---|---|---|
| 2013/0286960 A1 | 10/2013 | Li et al. |
| 2014/0134956 A1 | 5/2014 | Lee et al. |
| 2018/0331727 A1 | 11/2018 | John Wilson et al. |
| 2019/0173537 A1 | 6/2019 | Cai et al. |
| 2019/0239092 A1* | 8/2019 | Zhou ................... H04B 7/0695 |

(Continued)

OTHER PUBLICATIONS

Office Action received for corresponding European Patent Application No. 20195504.4, dated Apr. 26, 2024, 5 pages.

(Continued)

*Primary Examiner* — Fred A Casca
(74) *Attorney, Agent, or Firm* — Lippes Mathias LLP

(57) ABSTRACT

An apparatus comprising means for determining a set of beams for use in transmitting and/or receiving at least one signal in a first frequency range; determining at least one mapped beam, wherein determining the at least one mapped beam comprises mapping at least one beam of the set of beams to at least a second, different frequency range; and causing transmission and/or reception of at least one signal in the second, different frequency range using the at least one mapped beam.

9 Claims, 7 Drawing Sheets

(56) References Cited

U.S. PATENT DOCUMENTS

2020/0213872 A1 7/2020 Campos et al.
2021/0258898 A1* 8/2021 Ma .................. H04L 5/0053

OTHER PUBLICATIONS

"3rd Generation Partnership Project; Technical Specification Group Radio Access Network; NR; Physical layer procedures for data (Release 16)", 3GPP TS 38.214, V16.1.0, Mar. 2020, pp. 1-151.
"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.
Liu et al., "Wideband Beamforming Concepts and Techniques", John Wiley & Sons, 2010, 30 pages.
Cai, "Modeling and Mitigating Beam Squint in Millimeter Wave Wireless Communication", Dissertation, Mar. 2018, 159 pages.
Cai et al., "Effect of Wideband Beam Squint on Codebook Design in Phased-Array Wireless Systems", arXiv, Sep. 22, 2016, pp. 6 pages.
Extended European Search Report received for corresponding European Patent Application No. 20195504.4, dated Feb. 3, 2021, 12 pages.
"Beam squint analysis for FR2 UEs", 3GPP TSG-RAN WG4 Meeting #95-e, R4-2006781, Agenda: 6.14.1.9, Qualcomm Incorporated, May 2020, 16 pages.
"On the effect of beamforming with CA on beam correspondence", 3GPP TSG-RAN WG4 Meeting #94-e, R4-2001065, Agenda: 8.14.1.2, Fraunhofer HHI, Feb. 24-Mar. 6, 2020, 4 pages.
International Search Report and Written Opinion received for corresponding Patent Cooperation Treaty Application No. PCT/EP2021/073567, dated Nov. 22, 2021, 15 pages.

* cited by examiner

|  | angle [deg] | | | | |
|---|---|---|---|---|---|
| sub-band [GHz] | ... | -42 | -39 | -36 | -33 | ... |
| 55...57 | | 3 | 4 | 5 | 6 | |
| 57...59 | | 3 | 4 | 5 | 6 | |
| 59...61 | | 3 | 4 | 5 | 6 | |
| 61...63 | | 3 | 4 | 5 | 6 | |
| 63...65 | | 3 | 4 | 5 | 6 | |

FIG. 7A

|  | angle [deg] | | | | |
|---|---|---|---|---|---|
| sub-band [GHz] | ... | -42 | -39 | -36 | -33 | ... |
| 55...57 | | 3 | 4 | 5 | 6 | |
| 57...59 | | 3 | 4 | 4 | 5 | |
| 59...61 | | 2 | 3 | 4 | 5 | |
| 61...63 | | 1 | 2 | 4 | 5 | |
| 63...65 | | 1 | 2 | 3 | 4 | |

FIG. 7B

|  | Target sub-band | | | |
|---|---|---|---|---|
| Source sub-band | F1 | F2 | F3 | F4 |
| F1 | | | a → b | |
| F2 | | | | |
| F3 | | | | |
| F4 | | | | |

FIG. 7C

BEAM MANAGEMENT

RELATED APPLICATION

This application was originally filed as PCT Application No. PCT/EP2021/073567, filed on Aug. 26, 2021, which claims priority from EP Application Serial No. 20195504.4, filed on Sep. 10, 2020, each of which is incorporated herein by reference in its entirety.

TECHNOLOGICAL FIELD

Embodiments of the present disclosure relate to beam management. Some relate to beam management in 5G new radio (NR).

BACKGROUND

A wireless network comprises a plurality of network nodes including terminal nodes and access nodes. Communication between the terminal nodes and access nodes is wireless.

In some circumstances it may be desirable to enhance beam management of beams used for transmitting one or more signals between elements of a wireless network.

BRIEF SUMMARY

According to various, but not necessarily all, embodiments there is provided examples as claimed in the appended claims.

According to various, but not necessarily all, embodiments there is provided an apparatus comprising means for:
   determining a set of beams for use in transmitting and/or receiving at least one signal in a first frequency range;
   determining at least one mapped beam, wherein determining the at least one mapped beam comprises mapping at least one beam of the set of beams to at least a second, different frequency range; and
   causing transmission and/or reception of at least one signal in the second, different frequency range using the at least one mapped beam.

In some examples, the means are configured to cause transmission and/or reception of the at least one signal in the first frequency range using at least one of the set of beams.

In some examples, determining the at least one mapped beam comprises determining a plurality of mapped beams, and wherein determining the plurality of mapped beams comprises mapping a plurality of beams of the set of beams to a at least one different frequency range.

In some examples, mapping the at least one beam of the set of beams to at least the second, different frequency range comprises accessing at least one data structure based, at least in part, on the second, different frequency range and a target angle of incidence for one or more signals to be transmitted and/or received.

In some examples, the means are configured to determine the at least one mapped beam if a target angle of incidence for one or more signals to be transmitted and/or received is above a predetermined value.

In some examples, the means comprises
   at least one processor; and
   at least one memory including computer program code,
      the at least one memory and computer program code configured to, with the at least one processor, cause the performance of the apparatus.

According to various, but not necessarily all, embodiments there is provided a method comprising:
   determining a set of beams for use in transmitting and/or receiving at least one signal in a first frequency range;
   determining at least one mapped beam, wherein determining the at least one mapped beam comprises mapping at least one beam of the set of beams to at least a second, different frequency range; and
   causing transmission and/or reception of at least one signal in the second, different frequency range using the at least one mapped beam.

In some examples, the method comprises causing transmission and/or reception of the at least one signal in the first frequency range using at least one of the set of beams.

In some examples, determining the at least one mapped beam comprises determining a plurality of mapped beams, and wherein determining the plurality of mapped beams comprises mapping a plurality of beams of the set of beams to at least one different frequency range.

In some examples, mapping the at least one beam of the set of beams to at least the second, different frequency range comprises accessing at least one data structure based, at least in part, on the second, different frequency range and a target angle of incidence for one or more signals to be transmitted and/or received.

In some examples, the method comprises determining the at least one mapped beam if a target angle of incidence for one or more signals to be transmitted and/or received is above a predetermined value.

According to various, but not necessarily all, embodiments there is provided a computer program comprising instructions for causing an apparatus to perform at least the following:
   determining a set of beams for use in transmitting and/or receiving at least one signal in a first frequency range;
   determining at least one mapped beam, wherein determining the at least one mapped beam comprises mapping at least one beam of the set of beams to at least a second, different frequency range; and
   causing transmission and/or reception of at least one signal in the second, different frequency range using the at least one mapped beam.

In some examples, the computer program comprises instructions for causing an apparatus to cause transmission and/or reception of the at least one signal in the first frequency range using at least one of the set of beams.

In some examples, determining the at least one mapped beam comprises determining a plurality of mapped beams, and wherein determining the plurality of mapped beams comprises mapping a plurality of beams of the set of beams to at least one different frequency range.

In some examples, mapping the at least one beam of the set of beams to at least the second, different frequency range comprises accessing at least one data structure based, at least in part, on the second, different frequency range and a target angle of incidence for one or more signals to be transmitted and/or received.

In some examples, the computer program comprises instructions for causing an apparatus to determine the at least one mapped beam if a target angle of incidence for one or more signals to be transmitted and/or received is above a predetermined value.

According to various, but not necessarily all, embodiments there is provided an apparatus comprising means for:
   determining a configuration of a first set of beams for use in transmitting and/or receiving at least one signal in a first frequency range;

determining at least one mapped set of beams for use in transmitting and/or receiving at least one signal in a second, different frequency range, wherein determining the at least one mapped set of beams comprises determining a mapping of the first set of beams to at least the second, different frequency range; and causing transmission of at least the determined mapping of the first set of beams to at least the second, different frequency range to at least one apparatus.

In some examples, determining a mapping of the first set of beams to at least the second, different frequency range comprises determining which beam of the first set of beams should be used for different target angles of incidence in the second, different frequency range.

In some examples, determining the at least one mapped set of beams comprises determining a plurality of mapped sets of beams, and wherein determining the plurality of mapped sets of beams comprises determining a mapping of the first set of beams to a plurality of different frequency ranges.

In some examples, determining the at least one mapped set of beams comprises determining at least one data structure based, at least in part on the first set of beams; and wherein causing transmission of at least the determined mapping comprises causing transmission of one or more signals comprising information indicative of the at least one data structure and/or the at least one data structure.

In some examples, the means comprises
at least one processor; and
at least one memory including computer program code, the at least one memory and computer program code configured to, with the at least one processor, cause the performance of the apparatus.

According to various, but not necessarily all, embodiments there is provided a method comprising:
determining a configuration of a first set of beams for use in transmitting and/or receiving at least one signal in a first frequency range;
determining at least one mapped set of beams for use in transmitting and/or receiving at least one signal in a second, different frequency range, wherein determining the at least one mapped set of beams comprises determining a mapping of the first set of beams to at least the second, different frequency range; and
causing transmission of at least the determined mapping of the first set of beams to at least the second, different frequency range to at least one apparatus.

In some examples, determining a mapping of the first set of beams to at least the second, different frequency range comprises determining which beam of the first set of beams should be used for different target angles of incidence in the second, different frequency range.

In some examples, determining the at least one mapped set of beams comprises determining a plurality of mapped sets of beams, and wherein determining the plurality of mapped sets of beams comprises determining a mapping of the first set of beams to a plurality of different frequency ranges.

In some examples, determining the at least one mapped set of beams comprises determining at least one data structure based, at least in part on the first set of beams; and wherein causing transmission of at least the determined mapping comprises causing transmission of one or more signals comprising information indicative of the at least one data structure and/or the at least one data structure.

According to various, but not necessarily all, embodiments there is provided a computer program comprising instructions for causing an apparatus to perform at least the following:
determining a configuration of a first set of beams for use in transmitting and/or receiving at least one signal in a first frequency range;
determining at least one mapped set of beams for use in transmitting and/or receiving at least one signal in a second, different frequency range, wherein determining the at least one mapped set of beams comprises determining a mapping of the first set of beams to at least the second, different frequency range; and
causing transmission of at least the determined mapping of the first set of beams to at least the second, different frequency range to at least one apparatus.

In some examples, determining a mapping of the first set of beams to at least the second, different frequency range comprises determining which beam of the first set of beams should be used for different target angles of incidence in the second, different frequency range.

In some examples, determining the at least one mapped set of beams comprises determining a plurality of mapped sets of beams, and wherein determining the plurality of mapped sets of beams comprises determining a mapping of the first set of beams to a plurality of different frequency ranges.

In some examples, determining the at least one mapped set of beams comprises determining at least one data structure based, at least in part on the first set of beams; and wherein causing transmission of at least the determined mapping comprises causing transmission of one or more signals comprising information indicative of the at least one data structure and/or the at least one data structure.

According to various, but not necessarily all, embodiments there is provided a computer program comprising instructions for causing an apparatus to perform at least a part of one or more methods as disclosed and/or described herein.

The description of a function and/or action should additionally be considered to also disclose and means suitable for and/or configured to perform that function and/or action.

BRIEF DESCRIPTION

Some examples will now be described with reference to the accompanying drawings in which:

FIG. 7A shows another example of the subject matter described herein;

FIG. 7B shows another example of the subject matter described herein;

FIG. 7C shows another example of the subject matter described herein;

DETAILED DESCRIPTION

Figure 1:
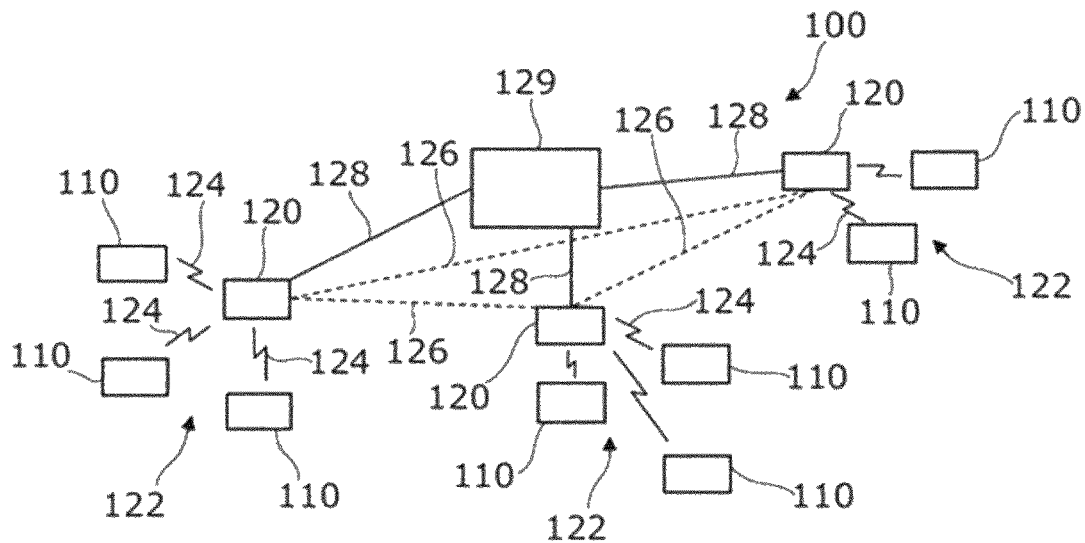
FIG. 1 shows an example of the subject matter described herein.

FIG. 1 illustrates an example of a network 100 comprising a plurality of network nodes including terminal nodes 110, access nodes 120 and one or more core nodes 129. The terminal nodes 110 and access nodes 120 communicate with each other. The one or more core nodes 129 communicate with the access nodes 120.

The network 100 is in this example a radio telecommunications network, in which at least some of the terminal nodes 110 and access nodes 120 communicate with each other using transmission/reception of radio waves/signals.

The one or more core nodes 129 may, in some examples, communicate with each other. The one or more access nodes 120 may, in some examples, communicate with each other.

The network 100 may be a cellular network comprising a plurality of cells 122 each served by an access node 120. In this example, the interface between the terminal nodes 110 and an access node 120 defining a cell 122 is a wireless interface 124.

The access node 120 is a cellular radio transceiver. The terminal nodes 110 are cellular radio transceivers.

In the example illustrated the cellular network 100 is a third generation Partnership Project (3GPP) network in which the terminal nodes 110 are user equipment (UE, see, for example, FIG. 4) and the access nodes 120 are base stations (for example, gNBs).

In the particular example illustrated the network 100 is an Evolved Universal Terrestrial Radio Access network (E-UTRAN). The E-UTRAN consists of E-UTRAN NodeBs (eNBs), providing the E-UTRA user plane and control plane (for example, RRC) protocol terminations towards the UE. The eNBs 120 are interconnected with each other by means of an X2 interface 126. The eNBs are also connected by means of the S1 interface 128 to the Mobility Management Entity (MME) 129.

In other example the network 100 is a Next Generation (or New Radio, NR) Radio Access network (NG-RAN). The NG-RAN consists of gNodeBs (gNBs), providing the user plane and control plane (for example, RRC) protocol terminations towards the UE. The gNBs are interconnected with each other by means of an X2/Xn interface 126. The gNBs are also connected by means of the N2 interface 128 to the Access and Mobility management Function (AMF).

In examples, the network 100 can comprise a combination of E-UTRAN and NG-RAN.

In some examples, nodes of the network, such as one or more terminal nodes 110 and/or one or more access nodes 120, utilize antenna directivity in wireless communications.

In examples, a set of beams or beam set configuration is determined, comprising a plurality of beams having associated directions or beamforming angles. The determined set of beams can be utilized in wireless communications in a network, such as the network illustrated in the example of FIG. 1.

In examples, a set of beams is configured to cover an area for transmission and/or reception of one or more signals from/to an apparatus, a beam covering a portion of the area.

In examples, a set of beams or beam set configuration can comprise information to allow the beams of the beam set to be formed. For example, a set of beams or beam set configuration can comprise control information for one or more phase-shifters to allow the beams of the set of beams to be formed.

The use of such a beam set can provide, for example, signal gain for the beams generally along the respective beamforming angles.

Examples of the disclosure can apply to any suitable frequency range or ranges. For example, examples of the disclosure can apply to beyond 52.6 GHz carrier frequencies, and/or unlicensed bands at 57-66 GHz and/or licensed/unlicensed bands at 66-71 GHz.

Additionally, or alternatively, examples of the disclosure can apply to above 71 GHz up to sub-THz range.

Additionally, or alternatively, examples of the disclosure can apply to above 100 GHz, that is THz range.

Additionally, or alternatively, examples of the disclosure can be applied to multi-band antennas, which work, for example, at 28 GHz and 39 GHz.

Figure 2:
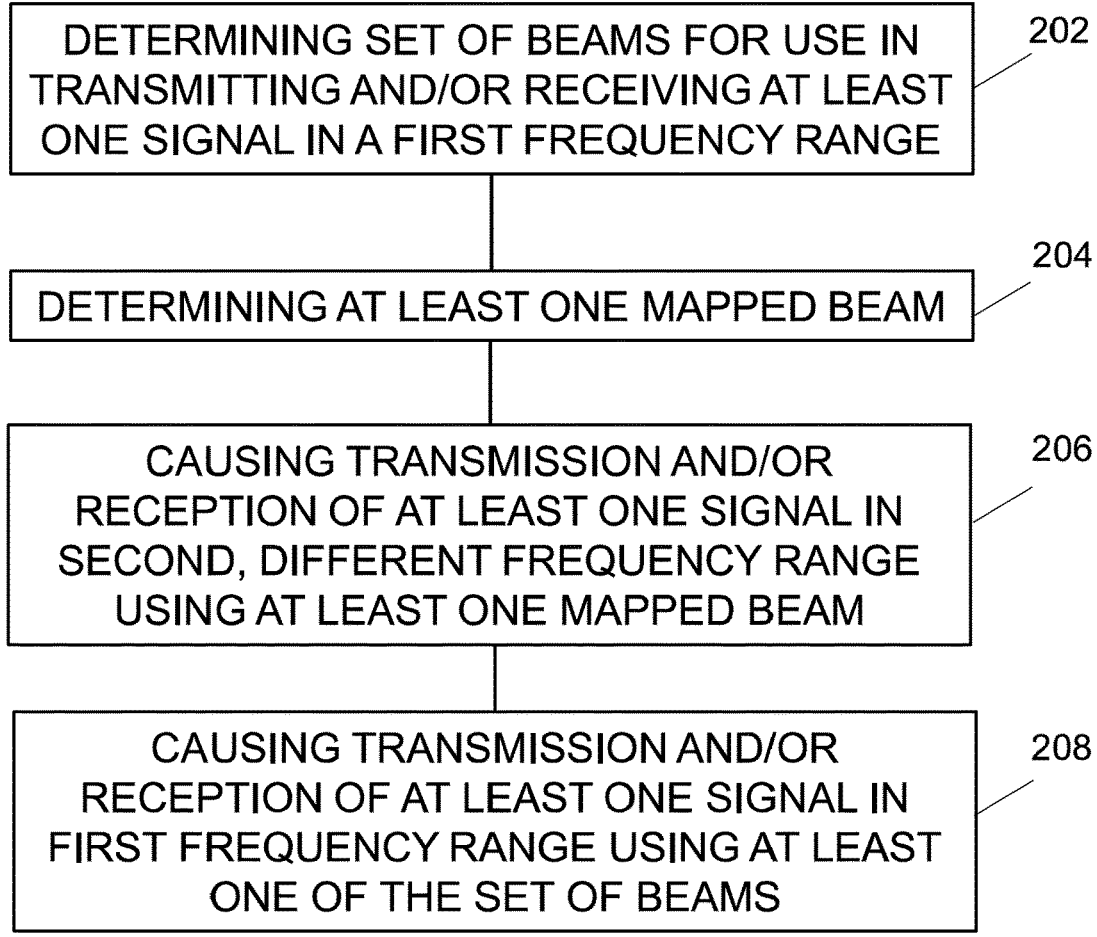
FIG. 2 shows another example of the subject matter described herein.

FIG. 2 illustrates an example of a method 200.

In examples, the method 200 can be performed by any suitable apparatus comprising any suitable means for performing the method 200. For example, an apparatus 130 as described in relation to FIG. 9A and or 9B.

Figure 4:
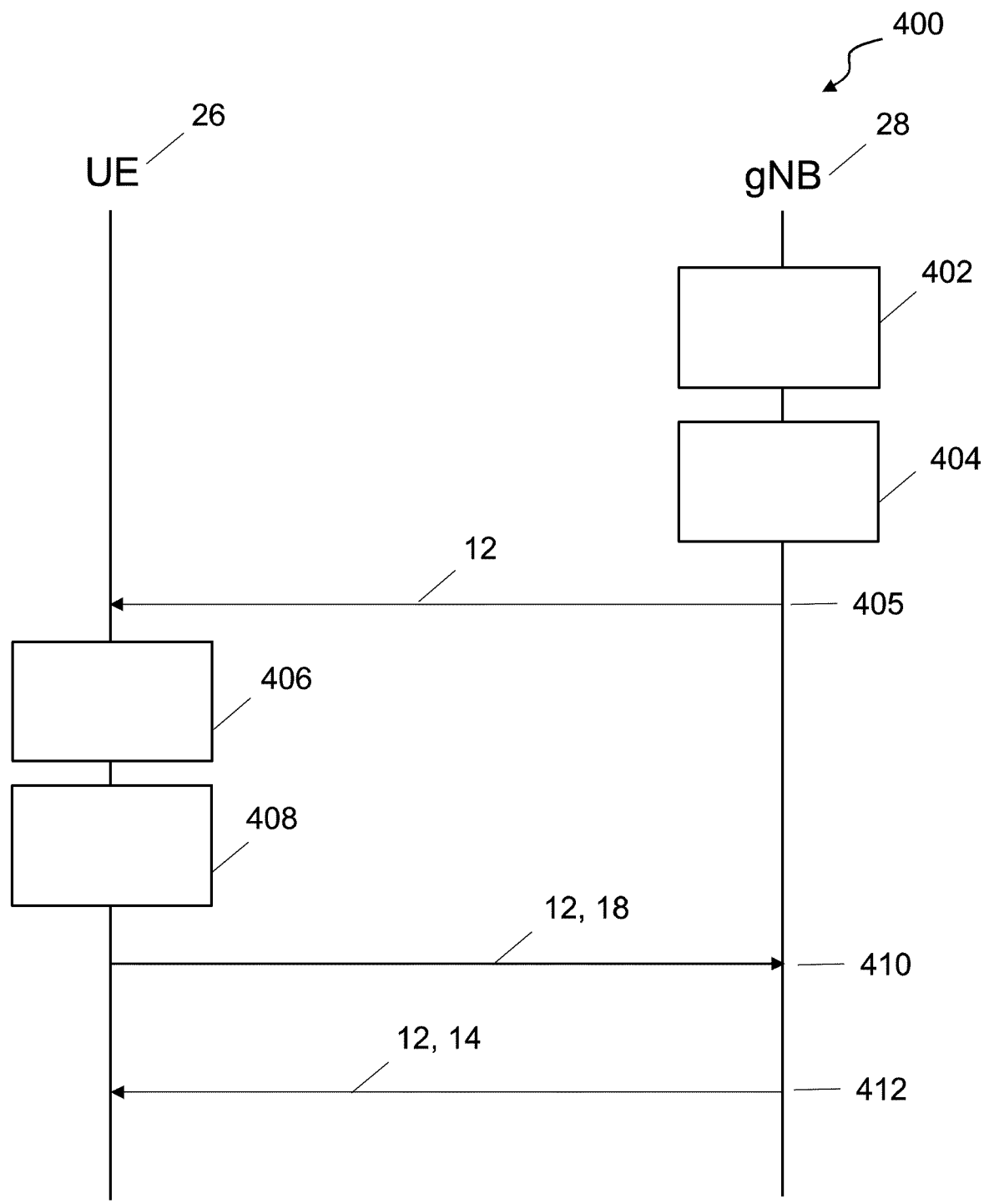
FIG. 4 shows another example of the subject matter described herein.

In examples, the method 200 can be performed by a terminal node 110, such as a UE 26 in FIG. 4 and/or an access node 120, such as a gNB 28 in FIG. 4. See, for example, FIG. 4.

In at least some examples, a communications network, such as the communications network 100 of FIG. 1, can implement relaying, such as integrated access and backhaul (IAB) technology by including one or more IAB nodes.

A communications network, such as the communications network 100 of FIG. 1, can include one or more IAB donor node which provides a wired connection to the core network. In examples, IAB technology supports wireless relaying in NG-RAN.

According to at least some examples, a DU (distributed unit) of an IAB node can perform one or more operations and/or actions and/or blocks described in the present disclosure as being performed by a gNB.

Further, according to at least some examples, a mobile termination (MT) part of an IAB node can perform one or more operations and/or actions and/or blocks described in the present disclosure as being performed by a UE.

One or more of the features discussed in relation to FIG. 2 can be found in one or more of the other figures. See, for example, FIG. 4 and/or FIG. 6.

At block 202 the method comprises determining a set of beams 10 for use in transmitting and/or receiving at least one signal 12 in a first frequency range 14.

In examples, a frequency range can be considered a sub-band.

In examples, a frequency range or sub-band can have any suitable width. For example, a frequency range can have a width in the range 1 to 5 GHz. In examples, a frequency range can have a width in the range 1.5 GHz to 2.5 GHz. In examples, a frequency range can have a width of approximately 2 GHz. In some examples, a frequency range has a width of 2.16 GHz.

In some examples, different frequency ranges can have different widths.

In examples a set of beams 10 can be considered a beam set configuration. Accordingly, in some examples, determining a set of beams 10 can be considered determining a beam set configuration. In some examples a beam set configuration can be considered to comprise beam set information.

In examples, determining a set of beams 10 can be considered to comprise determining information to allow formation and/or use of beams 10 in the beam set to transmit and/or receive one or more signals 12.

As used herein, the term "determining" (and grammatical variants thereof) can include, not least calculating, computing, processing, deriving, investigating, looking up (for example, looking up in a table, a database or another data structure), ascertaining and the like. Also, "determining" can include receiving (for example, receiving information), accessing (for example, accessing data in a memory) and the like. Also, "determining" can include resolving, selecting, choosing, establishing, and the like.

In examples, any suitable method for determining a set of beams 10 for use in transmitting and/or receiving at least one signal 12 in a first frequency range 14 can be used. A set of beams 10 can comprise any suitable number of beams 10.

For example, the set of beams 10 can be determined by accessing at least one memory 134. Additionally, or alternatively, the set of beams 10 can be determined based, at least in part, on information received from a separate apparatus.

In some examples, beam set configuration and/or beam set information for the first frequency range 14 can be received via one or more signals 12 and stored in at least one memory 134.

In examples, determining a set of beams 10 for use in transmitting and/or receiving at least one signal 12 in a first frequency range 14 can comprise two parts: determining a configuration of a set of beams 10 for use in transmitting and/or receiving at least one signal 12 in a first frequency range 14 and using the configuration of the first set of beams 10 to transmit and/or receive one or more signals 12.

In examples, determining a configuration of a set of beams 10 can be considered creating a configuration of a set of beams 10. In some examples, determining and/or creating a configuration of a set of beams 10 can comprise performing at least one beam training procedure.

In examples, determining a configuration of a set of beams 10 can comprise determining information to allow the beams of the beam set to be formed.

Figure 3:
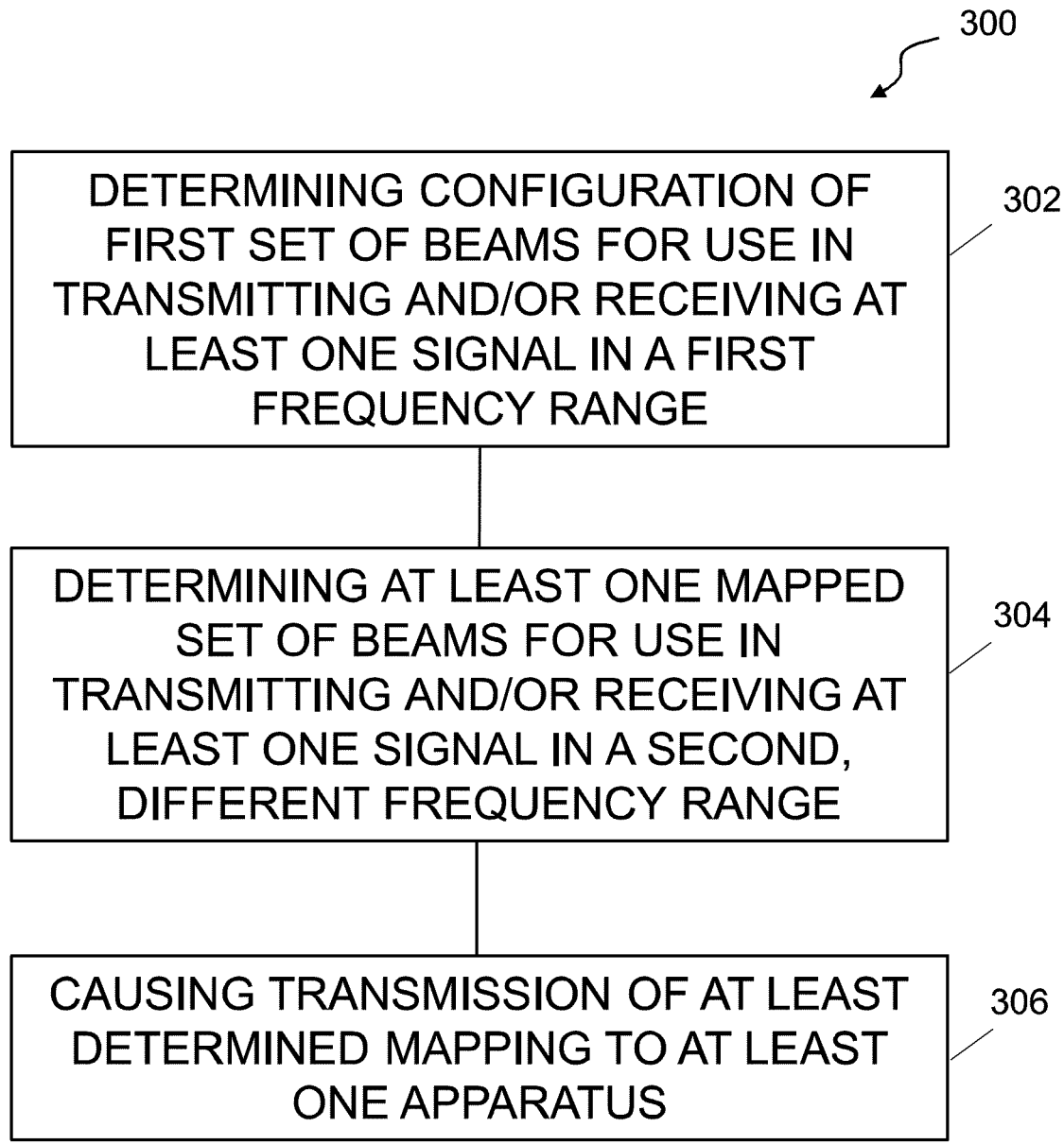
FIG. 3 shows another example of the subject matter described herein.

See, for example, block 302 of FIG. 3.

In some examples, determining a set of beams 10 for use in transmitting and/or receiving at least one signal 12 in a first frequency range 14 can comprise using a determined configuration of a set of beams 10 for use in transmitting and/or receiving at least one signal 12 in a first frequency range 14, wherein the configuration of the set of beams 10 is determined and/or created remotely and received by an apparatus 130. See, for example, FIG. 4.

Accordingly, in the example of FIG. 2, block 202 can, in examples, comprise determining and/or creating a beam set configuration and using the beam set configuration.

Accordingly, in the example of FIG. 2 block 202 can, in examples, comprise receiving a beam set configuration and using the received beam set configuration.

In some examples, block 202 can comprise using a beam set configuration.

The beams 10 of the set of beams 10 can be characterized and/or identified by a reference signal identity such as a synchronization signal block (SSB) index or channel state information reference signal (CSI-RS) resource identity.

In some examples determining a set of beams 10 comprises transmission and/or reception of one or more signals 12, such as SSB or CSI-RS via a first frequency range 14 to allow, for example, corresponding measurement at an apparatus or device, such as a UE 26.

In examples, transmission of such signal(s) can be limited to cover the first frequency range 14 and not one or more other frequency range(s), for example a second, different frequency range 18.

Accordingly, from a beam management point of view, transmission/reception of one or more signals 12 assisting beam management are not needed for other frequency range(s), such as a second, different frequency range 18, which reduces the overhead.

At block 204 the method 200 comprises determining at least one mapped beam 16, wherein determining at least one mapped beam comprises mapping at least one of the set of beams 10 to at least a second, different frequency range 18.

In examples and suitable method for determining at least one mapped beam 16 can be used.

In some examples, determining at least one mapped beam 16 can be considered and/or comprise determining which beam or beams 10 of the set of beams 10 to use for transmission and/or reception of one or more signals 12 in at least a second, different frequency range 18.

In examples, determining at least one mapped beam 16 can be considered and/or comprise determining how to use at least one beam 10 of the beam set configuration, determined for the first frequency range 14, in at least a second, different frequency range 18.

In examples, determining at least one mapped beam 16 can be considered and/or comprise determining which beam or beams 10 of the set of beams 10 to use in the at least one second, different frequency range 18 based, at least in part, on beam squint phenomenon.

In examples, determining at least one mapped beam 16 comprises determining at least one mapped beam 16 based, at least in part, on at least one target angle of incidence 22.

For example, determining at least one mapped beam 16 can comprise mapping at least one beam 10 of the set of beams 10 to at least a second, different frequency range 18 based, at least in part, on at least one target angle of incidence 22.

In examples, a target angle of incidence 22 can be considered an angle measured between the apparatus 130 and/or a device comprising the apparatus 130 and a target apparatus/device. In examples, an angle of incidence can be defined with respect to the boresight angle, which points directly ahead from an array center.

Accordingly, in examples, determining at least one mapped beam 16 can be considered determining which beam or beams 10 of the set of beams 10 to use for one or more target angle of incidence 22 in at least one second, different frequency range 18.

In examples, the at least one target angle of incidence 22 can be determined in any suitable way, using any suitable method.

In some examples, the at least one target angle of incidence 22 is determined based, at least in part, on one or more received reference signals.

For example, the at least one target angle of incidence 22 can be determined based, at least in part, on at least one reference signal measured in the first frequency range 14.

In some examples, the at least one target angle of incidence 22 can be determined based, at least in part, on at least one reference signal measured in the first frequency range 14 and not in the at least one second, different frequency range 18.

In examples, a target angle of incidence 22 is determined by SSB index and/or CSI-RX index in the first frequency range 14.

In this context, determining a target angle of incidence can comprise measuring SSB indices and/or CSI-RS indices, that represent beams 10 and thus angle of incidence 22 in the first frequency range 14 and reporting best index/indices. In examples, this can be done by a UE 26 which reports to a gNB 28.

In such a context, determining a target angle of incidence 22 can comprise providing, by, for example, a gNB 28, configuration of SSB indices and/or CSI-RS indices in the first frequency range 14 for an apparatus or device, such as a UE 26, to measure and report, and receiving the report.

In examples, determining at least one mapped beam 16 comprises determining a plurality of mapped beams 16, wherein determining a plurality of mapped beams 16 comprises mapping a plurality of beams 10 of the set of beams 10 to at least one different frequency range 18.

For example, a mapped beam 16 can be determined in a plurality of different frequency ranges.

For example, a plurality of mapped beams 16 can be determined in a plurality of different frequency ranges.

In some examples, the method 200 comprises determining at least one mapped beam 16 in a second, different frequency range 18 and determining at least one mapped beam 16 in a third, further different frequency range and so on.

In some examples, determining at least one mapped beam 16 can be considered determining at least one mapped beam 16 based, at least in part, on at least one target angle of incidence 22 and/or at least one second, different frequency range 18.

For example, determining at least one mapped beam 16 can comprise determining which beam 10 of the set of beams 10 to use for a target angle of incidence 22 in a second, different frequency range 18.

In some examples, mapping at least one beam 10 of the set of beams 10 to at least a second, different frequency range comprises accessing at least one data structure 20 based, at least in part, on the second, different frequency range 18 and a target angle of incidence 22 for one or more signals 12 to be transmitted and/or received.

In examples, the at least one data structure 20 can be considered and/or comprise a mapping table.

In examples, any suitable data structure(s) can be accessed in any suitable way based, at least in part, on the second, different frequency range 18 and a target angle of incidence 22.

In examples, the at least one data structure 20 can be determined in any suitable way.

For example, the at least one data structure 20 can be received and stored in at least one memory 134.

In some examples, the method 200 can comprise determining the at least one data structure 20.

In examples the at least one data structure 20 is configured to indicate, directly and/or indirectly, which beam 10 of the set of beams 10 to use for one or more target angle of incidence 22 and/or one or more ranges of target angle of incidence 22 for one or more different frequency ranges.

In examples, the at least one data structure 20 is configured to provide a one-to-one mapping between separate beams 10 in space and frequency defined in a closed form.

In examples, the at least one data structure 20 is dependent on the beamforming architecture.

See, for example, FIGS. 7A, 7B and 7C.

In examples, the at least one data structure is configured to provide a mapping between the beams 10 of the set of beams 10 in the first frequency range 14 to one or more different frequency ranges. This can, therefore, allow the determined information of the beams 10 in the first frequency range to be used for one or more different frequency ranges.

The information in the one or more data structures 20, which can be considered beam mapping information, can be determined in any suitable way. See, for example, block 304 of FIG. 3.

Accordingly, in some examples, the method 200 comprises determining mapping information of the at least one data structure 20.

In some examples, the set of beams 10 is used for a plurality of different frequency ranges for target angle of incidence 22 below a predetermined value.

Accordingly, in examples, the method 200 comprises determining at least one mapped beam 16 if a target angle of incidence 22 for one or more signals 12 to be transmitted or received is above a predetermined value.

In examples, any suitable predetermined value can be used. In some examples, the predetermined value can be determined based, at least in part, on antenna array characteristics. For example, number of antenna elements, distance between antenna array elements and so on.

In some examples, the predetermined value can be determined based, at least in part, on signal degradation caused by beam squint phenomenon. For example, the predetermined value can be determined based on a limit where beam squint phenomenon causes beams 10 determined in a first frequency range to be unsuitable in a different frequency range.

In examples, there can be a dependency between the frequency separation between the first and second frequency ranges 14, 18. For example, beam squint issue is considered for smaller values, if the frequency separation is large and vice versa.

In some examples, the predetermined value can be approximately 25 degrees.

In some examples, the predetermined value can be approximately 12 degrees.

Figure 8A:
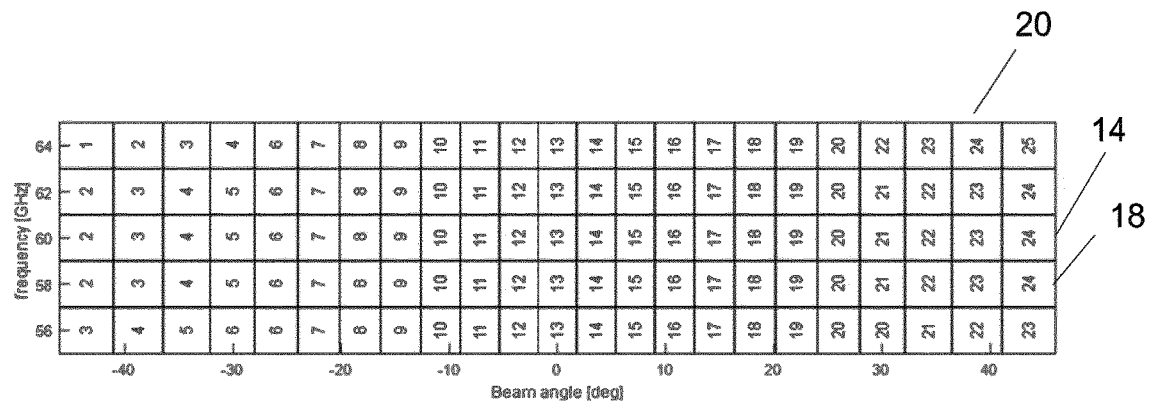
FIG. 8A shows another example of the subject matter described herein.
Figure 8B:
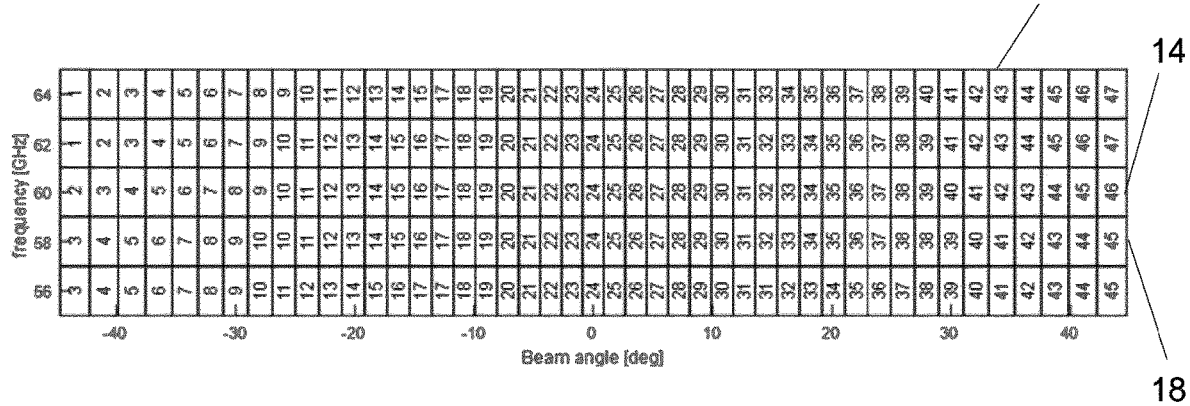
FIG. 8B shows another example of the subject matter described herein.

See, for example, FIGS. 8A and 8B.

Accordingly, in examples, a multi-mode operation can be used in which a first set of beams 10 can be used for target angle of incidence 22 for which beam squint does not significantly affect signal quality and a mapping of the first set of beams 10 used for target angle of incidence for which beam squint significantly affects signal quality.

For example, the first set of beams 10 can be used for one or more frequency ranges in which signal quality degradation due to beam squint within the one or more frequency ranges is tolerable.

At block 206 the method 200 comprises causing transmission and/or reception of at least one signal 12 in the second, different frequency range 18 using the at least one mapped beam 16.

For example, one or more signals 12 can be transmitted between a UE 26 and gNB 28 in the second, different frequency range. See, for example, FIG. 3.

Consequently, FIG. 2 illustrates a method 200 comprising:

determining a set of beams 10 for use in transmitting and/or receiving at least one signal 12 in a first frequency range 14;

determining at least one mapped beam 16, wherein determining at least one mapped beam comprises mapping at least one beam 10 of the set of beams 10 to at least a second, different frequency range 18; and causing transmission and/or reception of at least one signal 12 in the second, different frequency range 18 using at least one mapped beam 16.

Where a causing action is described herein, it should be understood that the corresponding action is also disclosed. For example, where causing transmission and/or reception of at least one signal 12 is described, transmitting and/or receiving at least one signal 12 is also disclosed.

Similarly, where an action is described herein, it should be understood that the corresponding causing action is also disclosed. For example, where transmitting and/or receiving at least one signal 12 is described, causing transmission and/or reception of at least one signal 12 is also disclosed.

At block 208 the method 200 comprises causing transmission and/or reception of at least one signal 12 in the first frequency range 14 using at least one of the set of beams 10.

For example, one or more signals 10 can be transmitted between a UE 26 and a gNB 28 in the first frequency range 14. See, for example, FIG. 4.

In examples, the one or more signals 12 can be transmitted to and/or from an apparatus and/or device from which configuration information of the set of beams 10 is received.

In examples, one or more signals 12 transmitted and/or received at different blocks of the method or methods described herein are unrelated. In some examples, one or more signals 12 transmitted and/or received at different blocks of the method or methods described herein are at least partially related.

In examples, one or more of the blocks of method 200 can be omitted. For example, block 208 can be omitted.

Examples of the disclosure are advantageous. For example, examples of the disclosure allow for beam mapping in a plurality of different frequency ranges, based on a design of a single set of beams in a single frequency range.

Enabling mapping in this way reduces system complexity and related signaling overhead, as, for example, beam training procedures are not performed for different frequency ranges or sub-bands or over all frequency ranges or sub-bands configured for the UE's operating bandwidth. In examples, operating bandwidth can be considered a bandwidth part (BWP).

For example, from a beam management point of view, transmission of signals assisting beam management are not needed for other frequency range(s), such as a second, different frequency range, which reduces the signaling overhead.

In examples, an efficient utilization of a single designed beam set over all sub-bands in a given frequency band is enabled.

Examples of the disclosure enable frequency domain multiplexing for apparatus, such as UEs, at different angle of incidence. Accordingly, examples of the disclosure provide for a single analog beamformer to provide coverage for two separate UE locations, when UEs have different sub-band allocations.

In examples, the data structure(s) or mapping table(s) can be used for interference mitigation schemes. As the data structure(s) can indicate the coverage of the beams of the set of beams over the spatial and frequency domain, transmission to a UE at a certain sub-band can be seen as interference to other UEs/gNBs at different angles, which are simultaneously utilizing other sub-bands.

Examples of the disclosure can alleviate antenna design aspects, as beam squint phenomenon can be seen as an advantage instead of a limiting factor.

FIG. 3 illustrates an example of a method 300.

In examples, the method 300 can be performed by any suitable apparatus comprising any suitable means for performing the method 300. For example, an apparatus 130 as described in relation to FIG. 9A and or 9B.

In examples, the method 300 can be performed by a terminal node 110, such as a UE 26 and/or an access node 120, such as a gNB 28. See, for example, FIG. 4.

At block 302, the method 300 comprises determining a configuration of a first set of beams 10 for use in transmitting and/or receiving at least one signal 12 in a first frequency range 14.

In examples, any suitable method can be used for determining a configuration of a first set of beams 10 for use in transmitting and/or receiving at least one signal 12 in a first frequency range 14. For example, any suitable beam set design method can be used.

In examples determining a configuration of a first set of beams 10 can be considered and/or comprise determining configuration information of a first set of beams 10.

In examples, determining a configuration of a first set of beams 10 for use in transmitting and/or receiving at least one signal 12 in a first frequency range 14 comprises performing and/or utilizing at least one beam training procedure.

In examples, a plurality of considered frequency ranges are determined. The bandwidth of the considered frequency ranges can be determined so that signal quality degradation due to beam squint within a frequency range is tolerable.

In some examples, a beam set can be designed for one of the considered frequency ranges. The beam set design can, for example, be based on discrete Fourier transform (DFT) based design, which preserves beam orthogonality.

In examples, oversampled DFT beams are used to provide a denser beam grid where adjacent beams are not orthogonal.

In some examples, a set of beams 10 is tailored to a certain environment so that the set of beams 10 covers the targeted spatial sector.

In examples, beams 10 can be in two dimensions, such as vertical and horizontal. In such examples, at least part of one or more of the methods described herein can be applied for both dimensions separately.

At block 304, the method 300 comprises determining at least one mapped set of beams 16 for use in transmitting and/or receiving at least one signal 12 in a second, different frequency range, wherein determining at least one mapped set of beams 16 comprises determining a mapping of the first set of beams 10 to at least the second, different frequency range 18.

In examples, determining at least one mapped set of beams 16 comprises determining a plurality of mapped sets of beams 16, wherein determining a plurality of mapped sets of beams comprises determining a mapping of the first set of beams 10 to a plurality of different frequency ranges.

For example, determining a mapping of the first set of beams 10 to a second, different frequency range 18 and a third, still different frequency range and so on.

In some examples, determining a mapping of the first set of beams 10 to at least the second, different frequency range 18 can be considered and/or comprises determining which beam or beams 10 of the set of beams 10 to use for transmission and/or reception of one or more signals 12 for different target angles of incidence 22 in at least a second, different frequency range 18.

In examples, determining a mapping of the first set of beams 10 to at least the second, different frequency range 18 can be considered and/or comprises determining how to use the beams 10 of the first set of beams 10, determined for the first frequency range 14, in at least a second, different frequency range 18.

In examples, determining a mapping of the first set of beams 10 to at least the second, different frequency range 18 can be considered and/or comprises determining which beam or beams 10 of the first set of beams 10 to use for different target angles of incidence 22 in the at least one second, different frequency range 18 based, at least in part, on beam squint phenomenon.

In some examples, determining a mapping of the first set of beams 10 to at least the second, different frequency range 18 can be considered and/or comprise determining which beam index of the beams 10 of the first set of beams 10 corresponds to different target angles of incidence 22 in at least one second, different frequency range 18 based, at least in part, on beam squint phenomenon.

In examples, determining a mapping of the first set of beams 10 to at least the second, different frequency range 18 can be considered and/or comprises determining which beam 10 of the first set of beams 10 should be used for different target angles of incidence 22 in at least the second, different frequency range 18.

In some examples, determining a mapping of the first set of beams 10 to at least the second, different frequency range 18 comprises determining which beam 10 of the first set of beams 10 is optimum for use with different target angles of incidence 22 in at least the second, different frequency range 18.

In examples, determining which beam 10 of the first set of beams 10 is optimum for use with different target angles of incidence 22 in at least the second, different frequency range 18 can be considered and/or comprise determining which beam of the first set of beams 10 is best suited for use with different target angles of incidence 22 in at least the second, different frequency range 18.

In examples, determining which beam 10 of the first set of beams 10 is optimum for use with different target angles of incidence 22 in at least the second, different frequency range 18 comprises determining which beam 10 of the first set of beams 10 is optimum based, at least in part, on expected signal quality and/or beam gain for the set of beams 10 at different target angles of incidence 22 in at least the second, different frequency range 18.

For example, determining which beam 10 of the first set of beams 10 is optimum for use with different target angles of incidence 22 in at least the second, different frequency range 18 can comprise determining which beam 10 of the first set of beams 10 will provide greatest signal quality and/or beam gain at different target angles of incidence 22 in at least the second, different frequency range 18.

Figure 5A:
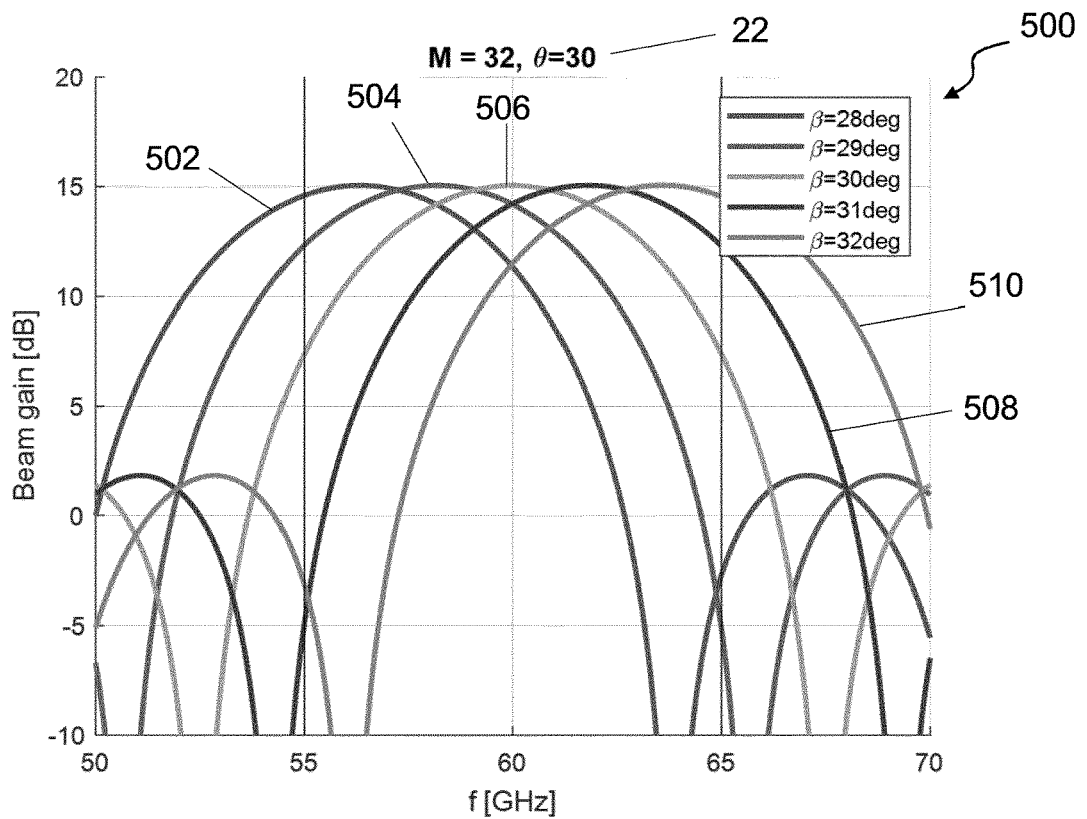
FIG. 5A shows another example of the subject matter described herein.
Figure 5B:
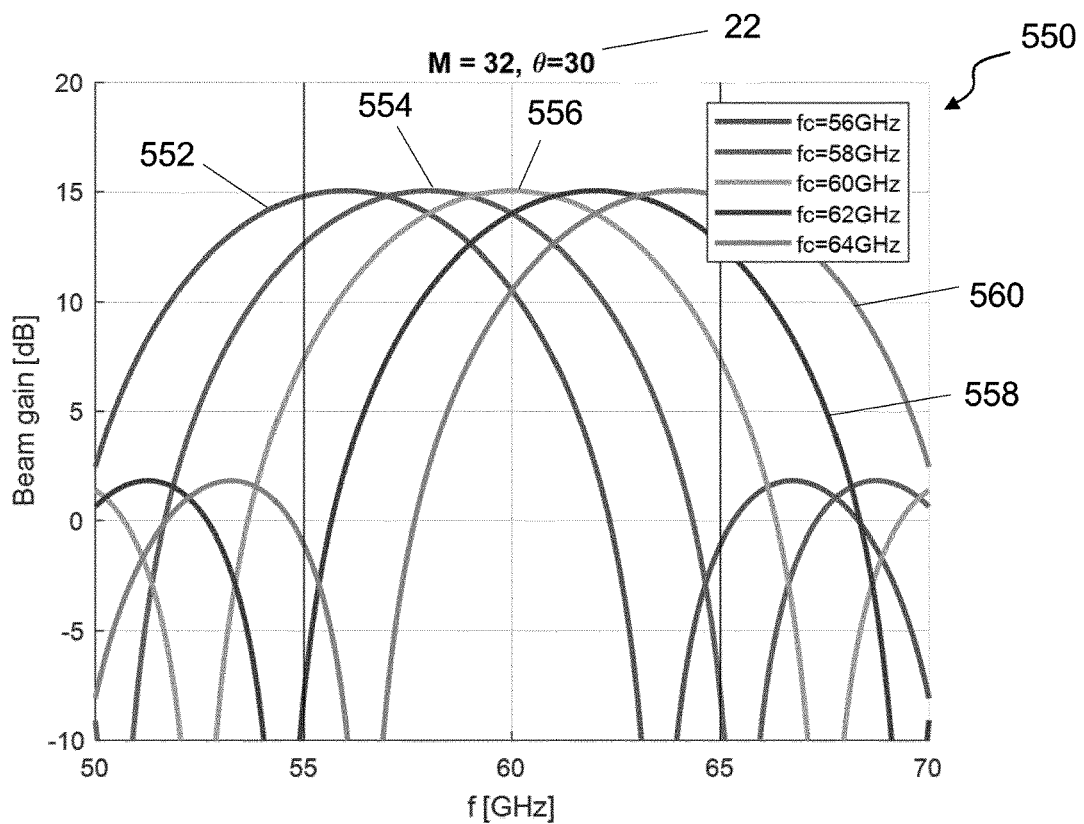
FIG. 5B shows another example of the subject matter described herein.

See, for example, FIGS. 5A and 5B.

FIGS. 5A and 5B illustrate example plots 500, 550 of frequency versus beam gain. In FIGS. 5A and 5B power spectra are shown for a beamformer of M=32 elements and a fixed angle of incidence θ=30 degrees.

In the example of FIG. 5A, a fixed beamformer center frequency $f_c$=60 GHz is used.

In FIG. 5A the different lines are for different beamforming angles (β). In the illustrated example, line 502 corresponds to β=28 deg, line 504 corresponds to β=29 deg, line 506 corresponds to β=30 deg, lines 508 corresponds to β=31 deg and line 510 corresponds to β=32 deg.

It can be seen from the example of FIG. 5A that a mismatch between the angle of incidence (θ) and the beamforming angle (β) results in a frequency shift of the beam power spectrum.

In the example of FIG. 5B the beamforming angle (β) is fixed such that β=θ=30 degrees. However, in the example of FIG. 5B, the beamformer center frequencies ($f_c$) are altered.

In FIG. 5B the different lines are for different beamformer center frequencies ($f_c$). In the illustrated example, line 552 corresponds to $f_c$=56 GHz, line 554 corresponds to $f_c$=58 GHz, line 556 corresponds to $f_c$=60 GHz, line 558 corresponds to $f_c$=62 GHz and line 560 corresponds to $f_c$=64 GHz.

It can be seen from the examples of FIGS. 5A and 5B that a mismatch between the angle of incidence and the beamforming angle is analogous to altering the beamformer center frequency. This can, in examples, be considered to be due to beam squint phenomenon.

The inventors have realized that this frequency shift caused by a mismatch between angle of incidence and beamforming angle can be used to allow a mapping between a first set of beams 10 at a first frequency range 14 to at least a second, different frequency range 18.

In examples, determining at least one mapped set of beams 16 comprises determining an antenna array response across one or more different frequency ranges.

For example, an antenna array response can be determined numerically via element-wise summations by considering the array geometry and determining phase shifts for the antenna elements according to a given angle of incidence 22.

Based on this, at least one data structure providing a mapping between different frequency ranges can be constructed. This approach is valid for any antenna array.

In some examples, determining at least one set of mapped beams 16 comprises utilizing one or more equations based, at least in part, on the characteristics of an antenna array to be used in transmitting and/or receiving one or more signals 12.

For example, for a one-dimensional uniform linear array (ULA), in order to determine a mapping, in some examples the optimum mapping, in the considered spatial domain and frequency domain a determination of the local minima and maxima of the beam power spectrum. In particular, the maximum value of the power spectrum function (that is the frequency where the response is maximized) can be determined as:

$$f_{maxGain} = \frac{f_c \sin(\beta)}{\sin(\theta)} \qquad \text{Equation 1}$$

Where: $f_c$ is the center frequency of the beamformer, β is the beamforming angle and θ is the angle of incidence.

In addition, power spectrum introduces zeros (local minima) at frequencies specified as:

$$f_{minGain} = \frac{\tau f_c \sin(\beta) - \frac{n2\pi}{M}}{\tau \sin(\theta)} \qquad \text{Equation 2}$$

Where: $\tau = 2\pi d_{ant}/c$, and n={ ..., −2, −1, 0, 1, 2, ... }, $d_{ant}$ is the difference between antenna array elements, M is the number of antenna array elements and c is the speed of light.

The main lobe of the beam power spectrum is located between the zeros given by n=−1 and n=1.

In examples, the distance between the zeros given by n=−1 and n=1 can be used to determine the bandwidth of the frequency range, which is affected by the array size M, antenna separation distance $d_{ant}$, and the physical angle of incidence θ.

Based on Equation 1 and/or Equation 2, it is possible to obtain appropriate transformations or mapping from beamforming angles at a first frequency range (sub-band), characterized by central frequency $f_c$, to another frequency range (sub-band), characterized by central frequency $f_i$, by:

$$\phi_{i,j} = \arcsin\left(\frac{f_i}{f_c}\sin(\beta_j)\right) \quad \text{Equation 3}$$

where $\phi_{i,j}$, is the required beamforming angle for the $j^{th}$ beam at the $i^{th}$ sub-band.

The corresponding beam index $q_{i,j}$ of the $j^{th}$ beam at the $i^{th}$ sub-band with respect to the original beam indices can be defined as:

$$q_{i,j} = \arg\min_k |\phi_{i,j} - \beta_k| \quad \text{Equation 4}$$

Based on this, in examples, it is possible to generate at least one data structure 20, which can be considered at least one beam mapping table, which indicates the beam index for the different frequency ranges (sub-bands) and angles of incidence 22.

See, for example, FIGS. 7A to 7C.

In examples, determining at least one mapped set of beams 16 comprises determining at least one data structure based, at least in part, on the first set of beams 10.

A similar process can be used for different array geometry, such as, for example, two-dimensional uniform rectangular array (URA) or circular array and so on.

For example, a similar process can be performed in two dimensions for a URA.

In some examples, at least part of block 304 can form part of block 204 in the example of FIG. 2.

Accordingly, in examples, determining at least one mapped beam 16 at block 204 can comprise determining at least one mapped set of beams 16.

In some examples, determining at least one mapped set of beams 16 can be described as follows:

First, the center frequencies of the considered sub-bands are determined. The bandwidth of each sub-band can be determined in such way that the signal quality degradation due to beam-squint within the sub-band is tolerable.

Next, a beam set design is performed for one of the sub-bands (for example, the middle one) and the center frequency of the considered sub-band determines the $f_c$ (for example, if the $m^{th}$ sub-band is chosen, then $f_c=f_m$).

The beam set design can be arbitrarily implemented, and it can be based, for example, on the traditional discrete Fourier transform based design, which preserves beam orthogonality.

In the next step of the sub-band-wise beam mapping process the beamforming angles from the designed beam set are mapped into separate sub-bands according to the previously shown equations.

In the end, the obtained sub-band-wise beamforming angles, are mapped into beam indices according to the generated beam set in the earlier step.

At block 306, the method 300 comprises causing transmission of at least the determined mapping of the first set of beams 10 to at least a second, different frequency range 18 to at least one apparatus.

Consequently, FIG. 3 illustrates a method 300 comprising:

determining a configuration of a first set of beams 10 for use in transmitting and/or receiving at least one signal in a first frequency range 14;

determining at least one mapped set of beams 16 for use in transmitting and/or receiving at least one signal in a second, different frequency range 18, wherein determining at least one mapped set of beams 16 comprises determining a mapping of the first set of beams 10 to at least the second, different frequency range 18; and causing transmission of at least the determined mapping of the first set of beams 10 to at least a second, different frequency range to at least one apparatus.

In examples, the determined mapping of the first set of beams 10 to at least a second, different frequency range 18 can be transmitted to at least one apparatus in any suitable way.

For example, causing transmission of at least the determined mapping of the first set of beams 10 to at least a second, different frequency range 18 to at least one apparatus can comprise causing transmission of at least one signal 12 to the at least one apparatus.

In examples, the at least one signal 12 can comprise information at least indicative of the determined mapping of the first set of beams 10 to at least a second, different frequency range 18.

In examples, the determined mapping can comprise at least one data structure 20.

In some examples, the at least one data structure 20 can be determined based, at least in part, on the first set of beams 10.

In examples, causing transmission of at least the determined mapping comprises causing transmission of one or more signals 12 comprising information indicative of the at least one data structure 20 and/or the at least one data structure 20.

In some examples, the method 300 comprises causing transmission of the determined configuration of the first set of beams 10 to at least one apparatus. The determined configuration of the first set of beams 10 can be transmitted with and/or separately from the determined mapping.

Accordingly, in some examples, the method 300 comprises causing transmission of the determined configuration of a first set of beams 10 for use in transmitting and/or receiving at least one signal 12 in a first frequency range 14 and of the determined mapping of the first set of beams 10 to at least a second, different frequency range 18 to an apparatus to allow the apparatus to perform the method 200 of FIG. 2.

For example, block 202 of FIG. 2 can comprise receiving the determined configuration of a first set of beams and block 204 of FIG. 2 can comprise receiving the determined mapping.

FIG. 4 illustrates an example of a method 400.

In the example of FIG. 4, a plurality of apparatuses communicate across a network. In examples, any suitable form of communication in any suitable network setup can be used. For example, at least a portion of the network 100 of FIG. 1 can be used.

In the illustrated example, a terminal node 110, in the form of a UE 26, communicates with an access node 120, in the form of a gNB 28.

In examples, the communications between the elements illustrated in the example of FIG. 4 can proceed via any number of intervening elements, including no intervening elements.

Although one UE 26 is illustrated in the example of FIG. 4, in examples any suitable number of UEs 26 can be included. For example, any suitable number of UEs 26 can be in communication with the gNB 28.

In examples, the signaling can be dedicated for one UE 26 or can be common for a plurality of UEs 26.

At block 402 the method 400 comprises determining, by the gNB 28, a configuration of a first set of beams 10 for use in transmitting and/or receiving at least one signal 12 in a first frequency range 14.

In examples, block 402 can be as described in relation to block 302 of FIG. 3.

At block 404, the method 400 comprises determining, by the gNB 28, at least one mapped set of beams 16 for use in transmitting and/or receiving at least one signal 12 in a second, different frequency range 18, wherein determining at least one mapped set of beams 16 comprises determining a mapping of the first set of beams 10 to at least the second, different frequency range 18.

In examples, block 404 can be as described in relation to block 304 of FIG. 3.

At block 405, at least one signal 12 is transmitted from the gNB 28 to the UE 26. The at least one signal 12 can be in the first frequency range 14.

In examples, block 405 can be as described in relation to block 306 of FIG. 3.

In the example of FIG. 4 the one or more signals 12 comprise a configuration of the first set of beams 10 and a determined mapping of the first set of beams 10 to at least a second, different frequency range 18.

As FIG. 4 illustrates one or more actions of transmission of at least one signal 12, FIG. 4 also illustrates the corresponding transmitting/causing transmission feature(s)/action(s).

Similarly, for any transmitting/causing transmission feature(s)/action(s), FIG. 2 also illustrates the corresponding receiving/causing receiving feature(s)/action(s).

Furthermore, for any receiving/causing reception feature(s)/action(s), FIG. 2 also illustrates the corresponding transmitting/causing transmission feature(s)/action(s).

For example, block 405 can be considered to illustrate causing transmission of one or more signals 12 and/or transmitting one or more signals 12 and/or causing reception of one or more signals 12 and/or receiving one or more signals 12.

At block 406, the method 400 comprises determining a set of beams 10 for use in transmitting and/or receiving at least one signal 12 in a first frequency range 14.

In examples, block 406 can be as described in relation to block 202.

In some examples, block 406 comprises PHY signaling between the UE 26 and gNB 28, for example SSB and/or CSI-RS.

In some examples, block 405 can be considered to form at least part of block 406. Accordingly, in some examples, receiving the one or more signals 12 at block 405 can be considered to form at least part of block 406.

At block 408, the method comprises determining at least one mapped beam 16, wherein determining at least one mapped beam 16 comprises mapping at least one beam 10 of the set of beams 10 to at least a second, different frequency range 18.

In examples, block 408 can be as described in relation to block 204.

At block 410 at least one signal 12 is transmitted from the UE 26 to the gNB 28 in the second, different frequency range 18 using at least one mapped beam 16.

In examples, block 410 can be as described in relation to block 206.

At block 412 at least one signal 12 is transmitted from the gNB 28 to the UE 26 in the first frequency range 14 using at least one of the set of beams 10.

In examples, block 412 can be as described in relation to block 208.

In examples, the roles of the gNB 28 and UE 26 in the method 400 can be swapped.

Additionally, or alternatively, one or more of the blocks of the method 400 can be shared between the UE 26 and the gNB 28.

In examples, both transmitter (for example, gNB 28) and receiver (for example, UE 26) follow the same data structure(s)/mapping table(s). Accordingly, in examples, this means that when transmitting or receiving signals via a certain sub-band, the beam pair link can be adjusted based on the same mapping table at both ends of the radio link.

Figure 6:
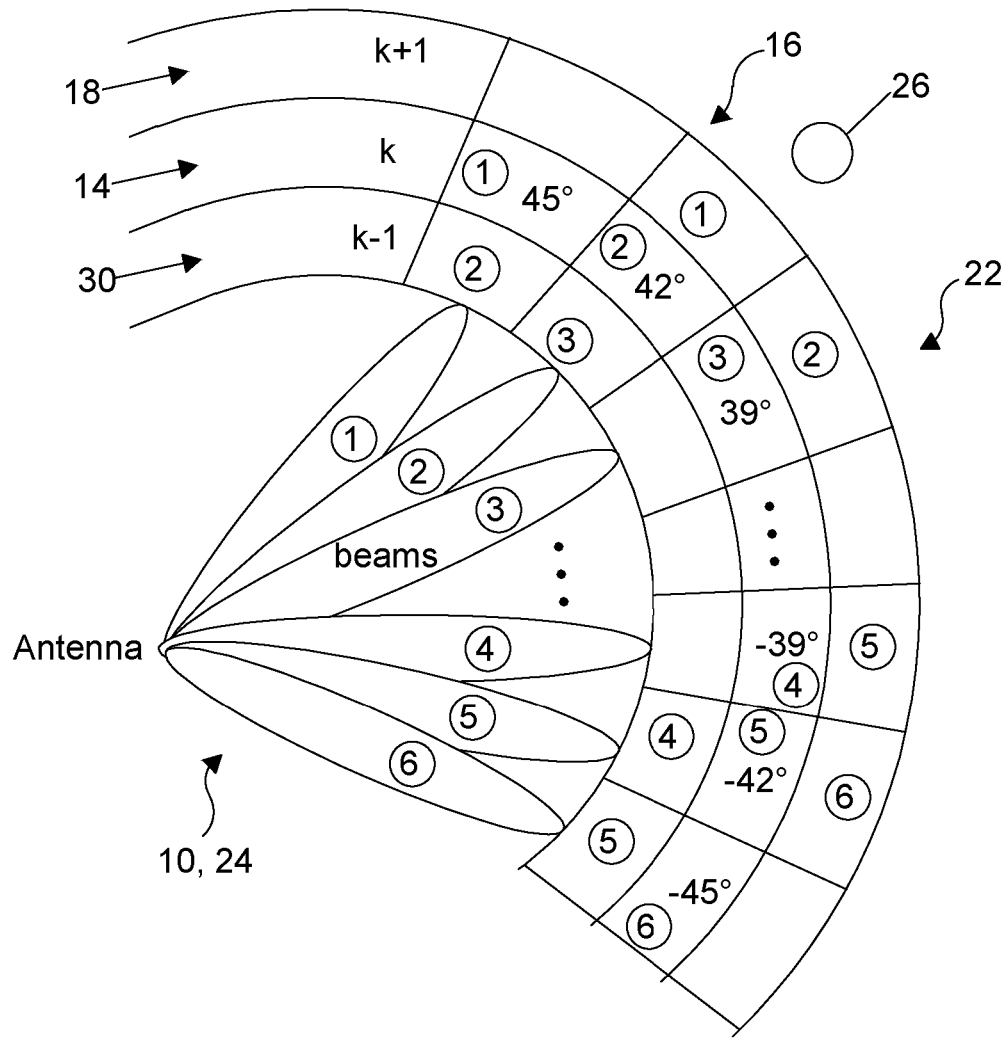
FIG. 6 shows another example of the subject matter described herein.

FIG. 6 illustrates an example of beam mapping. In particular, FIG. 6 illustrates an example of how beams 10 of a set of beams 10 can be mapped to a target angle or angles for different frequency ranges.

The example of FIG. 6 illustrates a ULA scenario.

In examples, each beam 10 of the set of beams 10 can be mapped to a target angle or angles for each frequency range or sub-band.

In the example of FIG. 6 a device has an antenna and a set of beams 10 has been determined for a first frequency range 14, also indicated as 'k' in the example of FIG. 6.

In the illustrated example, the illustrated set of beams 10 comprises 6 beams. However, in examples any suitable number of beams 10 can be used as illustrated by the ellipses in FIG. 6.

In the example of FIG. 6, in the first frequency range 14, the beam 10 labelled '1' is designed/configured for use in a direction centered on 45 degrees, the beam 10 labelled '2' is designed/configured for use in a direction centered on 42 degrees, the beam 10 labelled '3' is designed/configured for use in a direction centered on 39 degrees, the beam 10 labelled '4' is designed/configured for use in a direction centered on −39 degrees, the beam 10 labelled '5' is designed/configured for use in a direction centered on −42 degrees and the beam 10 labelled '6' is designed/configured for use in a direction centered on −45 degrees.

In examples, a direction centered on an angle can be considered a beam 10 generally towards that angle and/or a beam 10 towards substantially that angle.

In examples, the width of the angular range addressed by the beams 10 can depend on the width of the primary lobe of the beams 10.

In the example of FIG. 6 a second, different frequency range 18 and a third, different frequency range 30 are also illustrated. In the example, the second, different frequency range 18 is also indicated as 'k+1' and the third, different frequency range 30 is also indicated as 'k−1'.

By exploiting the frequency domain properties of the beams 10 discussed in relation to FIGS. 5A and 5B the beams 10 of the set of beams 10 in the first frequency range 14 can be mapped to the other frequency ranges 18, 30.

Due to the frequency shift of beam power spectrum, in the second, different frequency range 18 the direction centered on 42 degrees is addressed by the beam 10 labelled '1', the direction centered on 39 degrees is addressed by the beam 10 labelled '2', the direction centered on −39 degrees is addressed by the beam 10 labelled '5' and the direction centered on −42 degrees is addressed by the beam 10 labelled '6'.

Similarly, due to the frequency shift of the power spectrum, in the third, different frequency range 30 the direction centered on 45 degrees is addressed by the beam 10 labelled '2', the direction centered on 42 degrees is addressed by the beam 10 labelled '3', the direction centered on -42 degrees is addressed by the beam 10 labelled '4' and the direction centered on -45 degrees is addressed by the beam 10 labelled '5'.

Accordingly, the example of FIG. 6 also illustrates at least one mapped sets of beams 16.

In FIG. 6, each beam 10 covers a certain share of the spatial domain and frequency domain.

In the example of FIG. 6 a target device, in the form of a UE 26, is illustrated and is at an angle of incidence of 42 degrees with respect to the antenna of the device.

Accordingly, in the example of FIG. 6, the target UE 26 is covered by the beam 10 labelled '2' in the first frequency range 14, is covered by the beam 10 labelled '1' in the second, different frequency range 18 but which points at 45 degrees in the first frequency range 14 and is covered by the beam 10 labelled '3' in the third, different frequency range 30 but which points at 39 degrees in the first frequency range 14.

It can be seen from FIG. 6 how the beams 10 of a set of beams 10 designed for a first frequency range 14 can be mapped to other frequency ranges 18, 30.

In examples, based on this idea, a radio link can be managed by a single narrowband measurement signal transmitted/received via a single sub-band, and the measurement can be generalized to cover other and/or all sub-bands via the mapping.

FIGS. 7A to 7C illustrate examples of data structures 20.

In the examples of FIGS. 7A and 7B the data structures indicate which beam 10 (by way of a beam index) can be used to address different angle of incidence 22 in different frequency ranges.

In the example of FIG. 7A, there is no connection between frequency range (sub-band) and the associated beam 10 and therefore a set of beams 10 is designed for the different frequency ranges.

This approach can be used, for example, in a scenario where the total bandwidth or BWP bandwidth is relatively narrow, such that beam squint is not a problem, or in a scenario where separate BM process is configured for different frequency bands. The former case could happen, for example, for an initial BWP.

In the example, of FIG. 7B the inventive method disclosed herein is utilized and a single set of beams 10 are determined in a first frequency range 14. The first frequency range 14 is highlighted in the illustrated example.

The beams 10 of the set of beams 10 are mapped to the other frequency ranges, including a second, different frequency range 18 using the connection between a frequency range and the associated beam space.

In this way, the set of beams 10 determined in the first frequency range 10 can be used in the other frequency ranges.

The data structure 20 of FIG. 7B provides a mapping between the beams 10 of the set of beams 10 in the first frequency range 14 and the other frequency ranges.

For example, it can be determined from the data structure 20 of FIG. 7B that at angle -42 degrees in the second, different frequency range 18, beam index '3' of the set of beams from the first frequency range 14 should be used and so on.

Accordingly, in examples, the data structure 20 can be considered a mapping table.

FIG. 7 illustrates another example of a data structure 20.

The data structure 20 illustrated in the example of FIG. 7 can be considered another form of mapping table.

In the example of FIG. 7C, the data structure can be used to map from a source sub-band to a target sub-band.

For example, if an uplink grant is received in frequency range F1 via beam 'a' and relates to frequency range F3, data structure 20 of FIG. 7C can be used to determine that the uplink communication is transmitted according to beam 'b'.

FIGS. 8A and 8B illustrate examples of data structures 20. In examples, the data structures 20 can be considered mapping tables.

The data structures 20 illustrated in the examples of FIGS. 8A and 8B indicate which beam 10 (by beam index number) should be used for different angles and frequency ranges.

The data structure 20 of the example of FIG. 8A illustrates the outcome of the beam mapping process for an array having 32 elements using the discrete Fourier Transform based beam set design with 5 frequency ranges (sub-bands) 2 GHz wide.

It can be seen from the example of FIG. 8A that at low angles, the same beam index can be used across the different frequency ranges, but at higher angles, different beams are indicated in different frequency ranges.

As previously discussed, in examples, beam mapping can be performed for angles if incidence above a predetermined value dependent on antenna configuration. In the example of FIG. 8A, the same beam 10 can be used for the different frequency ranges up to approximately 28 degrees and -28 degrees.

The example of FIG. 8B is similar to the example of FIG. 8A but is for an array having 64 elements.

It can be seen in the example of FIG. 8B that the angle at which beam index differs in the different frequency ranges is lower than in the example of FIG. 8A. This is caused, at least in part, by the increased directionality of the beams 10 due to the increased number of elements.

In the example of FIG. 8B, the same beam 10 can be used for the different frequency ranges up to approximately 14 degrees to -14 degrees.

Some examples relate to third generation Partnership Project (3GPP) network. The following description can be considered to illustrate some such examples.

In examples, the UE 26 actions can be described as follows:

At the starting point, UE 26 operates according to "Wideband (WB) beam operation" (frequency-space).

According to the WB beam operation, there is no connection between sub-band (frequency) and the associated beam (space). See, for example, FIG. 7A. As discussed, in examples, the UE 26 operates according to initial BWP configuration.

UE 26 receives (or defines) a mapping table (or at least one parameter indicative to the mapping table) of beam indices in the first frequency and corresponding beam indices in the second frequency.

This relates to a "Narrowband (NB) beam operation" (frequency-space). In examples, this operation relates to UE-specific BWP configuration. According to the NB beam operation, there is a predefined connection between a sub-band (frequency) and the associated beam (space). See, for example, FIG. 7B.

Beam index can be, for example, SSB index.

UE 26 receives configuration of a signal to be received in the second frequency and the signal is associated with the beam index in the first frequency.

This can be seen as a switch from "WB beam operation" to "NB beam operation" for the corresponding signal.

The signal can be any signal associated to the predefined beams (e.g. SSB beams).

UE 26 determines the beam index in the second frequency corresponding to the beam index in the first frequency based on the mapping table.

UE 26 receives signal in the second frequency where the signal is associated with the beam index in the first frequency.

UE 26 may be separately configured and/or activated to perform above determination An example of beam mapping from one frequency to another is given below:
- UE 26 is configured to operate according to "NB beam operation"
- UE 26 receives UL grant via sub-band F1 according to beam a
- Based on UL grant, Physical Uplink Shared Channel (PUSCH) transmission relates to sub-band F3
- UE 26 determines the beamforming configuration (to be used by gNB) according to the mapping table (see, for example, FIG. 7C)
  - Based on the table, PUSCH is transmitted according to beam b The corresponding gNB 28 actions can be described as follows:
- gNB 28 transmits a mapping table of beam indices (or at least one parameter indicative to the mapping table) in the first frequency and corresponding beam indices in the second frequency
  - Beam index can be, for example, SSB index
  - This can be higher layer signalling (dedicated, or broadcasted)
- gNB 28 transmits configuration of a signal to be received in the second frequency and the signal is associated with the beam index in the first frequency
- gNB 28 determines the beam index in the second frequency corresponding to the beam index in the first frequency based on the mapping table
- gNB 28 transmits/receives the signal in the second frequency using the determined beam index In addition to the above-described UE 26 actions and gNB 28 actions, where the gNB 28 provides and signals the beam mapping table to the UE 26, similar signalling regarding the UE 26 beam mapping from UE 26 to gNB 28 can be applied.

Examples of the disclosure are advantageous.

Examples of the disclosure reduce system complexity and related signalling overhead by allowing one-to-one mapping between separate beams in space and frequency.

Examples of the disclosure enable to operate with wide sectors (that is large beamforming angles) in the scenario of wide bandwidth and narrow beams. This can reduce the amount of hardware resources at the base station.

Examples of the disclosure allows to leverage the existing beam management (BM) procedures maximally in the new scenarios.

Examples of the disclosure allow various scheduling options, such as scheduling between frequency bands. This can reduce the control signaling overhead and enable various implementation options, for a wideband scenario, for both UE and gNB.

When working in narrowband (NB) beam operation, examples of the disclosure enable frequency domain multiplexing for UEs at different angles of incidence. Thus, a single analog beamformer can provide coverage for two separate UE locations, when UEs have different sub-bands allocations.

The mapping table provided by examples of the disclosure, can be used for interference mitigation schemes, since the coverage of each beam is directly shown over the spatial and frequency domain. For example, a transmission to one UE at a certain sub-band can be seen as interference to other UEs/gNBs (at different locations/angles), which are simultaneously utilizing other sub-bands.

Examples of the disclosure can alleviate antenna design aspects, because the beam squint phenomenon can also be seen as an advantage, instead of merely a limiting factor.

Figure 9A:
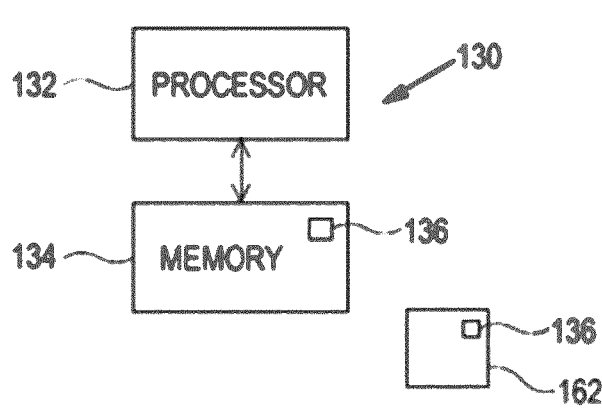
FIG. 9A shows another example of the subject matter described herein.

FIG. 9A illustrates an example of an apparatus 130. The apparatus 130 may be a controller of an apparatus or device such as a terminal node 110, for example UE 26, or an access node 120, such as a gNB 28.

Implementation of apparatus 130 may be as controller circuitry. The apparatus 130 may be implemented in hardware alone, have certain aspects in software including firmware alone or can be a combination of hardware and software (including firmware).

As illustrated in FIG. 9A the apparatus 130 may be implemented using instructions that enable hardware functionality, for example, by using executable instructions of a computer program 136 in a general-purpose or special-purpose processor 132 that may be stored on a computer readable storage medium (disk, memory etc.) to be executed by such a processor 132.

The processor 132 is configured to read from and write to the memory 134. The processor 132 may also comprise an output interface via which data and/or commands are output by the processor 132 and an input interface via which data and/or commands are input to the processor 132.

The memory 134 stores a computer program 136 comprising computer program instructions (computer program code) that controls the operation of the apparatus 130 when loaded into the processor 132. The computer program instructions, of the computer program 136, provide the logic and routines that enables the apparatus 130 to perform at least a portion of the methods illustrated in FIGS. 2 and/or 3 and/or 4. The processor 132 by reading the memory 134 is able to load and execute the computer program 136.

In examples, the apparatus 130 therefore comprises:
at least one processor 132; and
at least one memory 134 including computer program code
the at least one memory 134 and the computer program code configured to, with the at least one processor 132, cause the apparatus 130 at least to perform:
determining a set of beams for use in transmitting and/or receiving at least one signal in a first frequency range;
determining at least one mapped beam, wherein determining at least one mapped beam comprises mapping at least one beam of the set of beams to at least a second, different frequency range; and
causing transmission and/or reception of at least one signal in the second, different frequency range using at least one mapped beam.

In examples, the apparatus 130 therefore comprises:
at least one processor 132; and
at least one memory 134 including computer program code
the at least one memory 134 and the computer program code configured to, with the at least one processor 132, cause the apparatus 130 at least to perform:

determining a configuration of a first set of beams for use in transmitting and/or receiving at least one signal in a first frequency range;

determining at least one mapped set of beams for use in transmitting and/or receiving at least one signal in a second, different frequency range, wherein determining at least one mapped set of beams comprises determining a mapping of the first set of beams to at least the second, different frequency range; and causing transmission of at least the determined mapping of the first set of beams to at least a second, different frequency range to at least one apparatus.

As illustrated in FIG. 9A, the computer program 136 may arrive at the apparatus 130 via any suitable delivery mechanism 162. The delivery mechanism 162 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 136. The delivery mechanism may be a signal configured to reliably transfer the computer program 136. The apparatus 130 may propagate or transmit the computer program 136 as a computer data signal.

Computer program instructions for causing an apparatus to perform at least the following or for performing at least the following:

determining a set of beams for use in transmitting and/or receiving at least one signal in a first frequency range;

determining at least one mapped beam, wherein determining at least one mapped beam comprises mapping at least one beam of the set of beams to at least a second, different frequency range; and causing transmission and/or reception of at least one signal in the second, different frequency range using at least one mapped beam.

Computer program instructions for causing an apparatus to perform at least the following or for performing at least the following:

determining a configuration of a first set of beams for use in transmitting and/or receiving at least one signal in a first frequency range;

determining at least one mapped set of beams for use in transmitting and/or receiving at least one signal in a second, different frequency range, wherein determining at least one mapped set of beams comprises determining a mapping of the first set of beams to at least the second, different frequency range; and causing transmission of at least the determined mapping of the first set of beams to at least a second, different frequency range to at least one apparatus.

The computer program instructions may be comprised in a computer program, a non-transitory computer readable medium, a computer program product, a machine readable medium. In some but not necessarily all examples, the computer program instructions may be distributed over more than one computer program.

Although the memory 134 is illustrated as a single component/circuitry it may be implemented as one or more separate components/circuitry some or all of which may be integrated/removable and/or may provide permanent/semi-permanent/dynamic/cached storage.

Figure 9B:
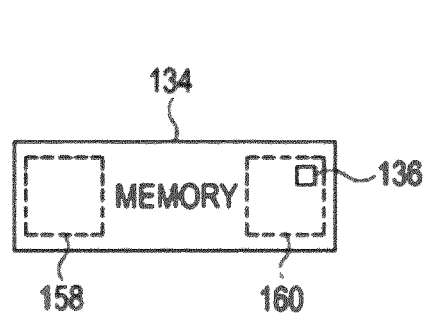
FIG. 9B shows another example of the subject-matter described herein.

In examples the memory 134 comprises a random access memory 158 and a read only memory 160. In examples the computer program 136 can be stored in the read only memory 158. See, for example, FIG. 9B In some examples the memory 134 can be split into random access memory 158 and read only memory 160.

Although the processor 132 is illustrated as a single component/circuitry it may be implemented as one or more separate components/circuitry some or all of which may be integrated/removable. The processor 132 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 2 and/or 3 and/or 4 may represent steps in a method and/or sections of code in the computer program 136. The illustration of a particular order to the blocks does not necessarily imply that there is a required or preferred order for the blocks and the order and arrangement of the block may be varied. Furthermore, it may be possible for some blocks to be omitted.

For example, block 208 of FIG. 2 can be omitted.

Where a structural feature has been described, it may be replaced by means for performing one or more of the functions of the structural feature whether that function or those functions are explicitly or implicitly described.

Thus, the apparatus 130 can, in examples, comprise means for determining a set of beams for use in transmitting and/or receiving at least one signal in a first frequency range;

determining at least one mapped beam, wherein determining the at least one mapped beam comprises mapping at least one beam of the set of beams to at least a second, different frequency range; and causing transmission and/or reception of at least one signal in the second, different frequency range using at least one mapped beam.

Thus, the apparatus 130 can, in examples, comprise means for determining a configuration of a first set of beams for use in transmitting and/or receiving at least one signal in a first frequency range;

determining at least one mapped set of beams for use in transmitting and/or receiving at least one signal in a second, different frequency range, wherein determining at least one mapped set of beams comprises determining a mapping of the first set of beams to at least the second, different frequency range; and causing transmission of at least the determined mapping of the first set of beams to at least a second, different frequency range to at least one apparatus.

In examples, an apparatus 130 can comprise means for performing one or more methods, or at least part of one or more methods, as disclosed herein.

In examples, an apparatus 130 can be configured to perform one or more methods, or at least a part of one or more methods, as disclosed herein.

Where one or more elements are described as being 'for' an action or actions, the one or more elements should also be considered to be configured to perform that action or actions. For example, an element for transmitting, should also be considered an element configured to transmit and vice versa.

The above described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising at least one processor and at least one memory including instructions that when executed by the at least one processor, cause the apparatus at least to perform:

determining a set of beams for use in transmitting and/or receiving at least one signal in a first frequency range;

determining at least one mapped beam, wherein determining the at least one mapped beam comprises mapping at least one beam of the set of beams to at least a second, different frequency range and determining which beam of the set of beams to use for transmission and/or reception of the at least one signal in at least the second frequency range; and causing transmission and/or reception of at least one signal in the second, different frequency range using the at least one mapped beam, wherein mapping the at least one beam of the set of beams to at least the second, different frequency range comprises accessing at least one data structure based, at least in part, on the second, different frequency range and a target angle of incidence for one or more signals to be transmitted and/or received.

2. An apparatus as claimed in claim 1, wherein the at least one processor and the at least one memory cause the apparatus to cause transmission and/or reception of the at least one signal in the first frequency range using at least one of the set of beams.

3. An apparatus as claimed in claim 1, wherein determining the at least one mapped beam comprises determining a plurality of mapped beams, and wherein determining the plurality of mapped beams comprises mapping a plurality of beams of the set of beams to at least one different frequency range.

4. An apparatus as claimed in claim 1, wherein the at least one processor and the at least one memory cause the apparatus to determine the at least one mapped beam when a target angle of incidence for one or more signals to be transmitted and/or received is above a predetermined value, wherein the predetermined value is determined based, at least in part, on signal degradation caused by beam squint phenomenon.

5. A method comprising:
determining a set of beams for use in transmitting and/or receiving at least one signal in a first frequency range;
determining at least one mapped beam, wherein determining the at least one mapped beam comprises mapping at least one beam of the set of beams to at least a second, different frequency range and determining which beam of the set of beams to use for transmission and/or reception of the at least one signal in at least the second frequency range; and
causing transmission and/or reception of at least one signal in the second, different frequency range using the at least one mapped beam,
wherein the method further comprises:
determining the at least one mapped beam when a target angle of incidence for one or more signals to be transmitted and/or received is above a predetermined value, wherein the predetermined value is determined based, at least in part, on signal degradation caused by beam squint phenomenon.

6. A method as claimed in claim 5, wherein determining the at least one mapped beam comprises determining a plurality of mapped beams, and wherein determining the plurality of mapped beams comprises mapping a plurality of beams of the set of beams to at least one different frequency range.

7. An apparatus comprising at least one processor and at least one memory including instructions that when executed by the at least one processor, cause the apparatus at least to perform:
determining a configuration of a first set of beams for use in transmitting and/or receiving at least one signal in a first frequency range;
determining at least one mapped set of beams for use in transmitting and/or receiving at least one signal in a second, different frequency range, wherein determining the at least one mapped set of beams comprises determining a mapping of the first set of beams to at least the second, different frequency range and determining which beam of the set of beams is to be used for transmission and/or reception of the at least one signal in at least the second frequency range; and
causing transmission of at least the determined mapping of the first set of beams to at least the second, different frequency range to at least one apparatus,
wherein determining the at least one mapped set of beams comprises determining at least one data structure based, at least in part on the first set of beams; and wherein causing transmission of at least the determined mapping comprises causing transmission of one or more signals comprising information indicative of the at least one data structure and/or the at least one data structure.

8. An apparatus as claimed in claim 7, wherein determining a mapping of the first set of beams to at least the second, different frequency range comprises determining which beam of the first set of beams should be used for different target angles of incidence in the second, different frequency range.

9. An apparatus as claimed in claim 7, wherein determining the at least one mapped set of beams comprises determining a plurality of mapped sets of beams, and wherein determining the plurality of mapped sets of beams comprises determining a mapping of the first set of beams to a plurality of different frequency ranges.

* * * * *